No. 844,554. PATENTED FEB. 19, 1907.
B. M. DES JARDINS.
CALCULATING DEVICE.
APPLICATION FILED MAY 17, 1895.

Witnesses:
John Darby
Edward E. Claussen

Inventor:
Benj. M. DesJardins

No. 844,554. PATENTED FEB. 19, 1907.
B. M. DES JARDINS.
CALCULATING DEVICE.
APPLICATION FILED MAY 17, 1896.

Witnesses:
John Darby
Edward E. Claussen

Inventor:
Benj. M. DesJardins

No. 844,554. PATENTED FEB. 19, 1907.
B. M. DES JARDINS.
CALCULATING DEVICE.
APPLICATION FILED MAY 17, 1895.

UNITED STATES PATENT OFFICE.

BENJAMIN M. DES JARDINS, OF HARTFORD, CONNECTICUT, ASSIGNOR, BY MESNE ASSIGNMENTS, TO THE UNITYPE COMPANY, A CORPORATION OF NEW JERSEY.

CALCULATING DEVICE.

No. 844,554.     Specification of Letters Patent.     Patented Feb. 19, 1907.

Application filed May 17, 1895. Serial No. 549,729.

*To all whom it may concern:*

Be it known that I, BENJAMIN M. DES JARDINS, a citizen of the United States, residing at Hartford, in the county of Hartford and State of Connecticut, have invented a new and useful Calculating Device, of which the following is a specification.

This invention relates to calculators, and particularly instruments for the mechanical solution of certain kinds of problems in multiplication, division, addition, and subtraction, and for extracting the square root. The instrument which is herein described as an embodiment of my invention is also adapted to gage the dimensions of the substances so computed, and it can give the location of a required article or substance. It is particularly adapted to indicate the result to the eye by pointing to prearranged figures on suitably-graduated scales, which are interchangeable for performing different kinds of problems or for indicating the special sizes of prearranged substances.

The mode of operation of the instrument will be better understood by first referring to certain well-known geometrical theorems which are included in the underlying principles of the construction of the instrument illustrating my invention—that is to say, if any number of transversals passing through a common point intersect any one of a series of equidistant parallel lines, so that the segments of the line are equal, then, first, each of the remaining lines of the series is divided into equal segments; second, each transversal is divided into equal segments; third, the difference between the length of the segments of any two consecutive transversals are proportional to the distance between them. Also if the segments of the line cut by the transversals are not equal the segments of the other parallels will be proportional to them. There are also other geometrical elements included, which are referred to farther on.

The herein-described calculator is constructed by mechanically producing parts which are adapted in a simple way to represent the various lines above referred to, making an instrument which may be used in a number of ways and which is applicable to many useful purposes connected with various kinds of calculations, especially when values, dimensions, or figures are in their natural arrangement—that is, in an increasing or decreasing order. The three main graduated scales, which may represent numbers, values, or dimensions, are constructed one of them to represent the distances apart of the parallels referred to, a second one to represent the numbers and positions of the radials, and a third the height of the segment or number of segments of parallels employed. Two of the adjoining transversals referred to, one being preferably the normal, are mechanically constructed in the form of a reference or test gage whose graduations correspond to the parallels referred to, the said gage being graduated to correspond with and employed in connection with the instrument for specific purposes.

Briefly stated, the mode of operating the instrument consists in producing a number of consecutive triangles, which have their apices on a common point and their bases upon the same straight line, the number of said triangles employed designating the number of parts which are counted or necessary in connection with a given quantity. The same general method is employed whether the process is to be addition, subtraction, multiplication, division, or for extracting the square root. The segments of the base are fixed proportional to the parts required and the segments on a line parallel to the base and located at a determined distance from the apex will give the dimensions of the parts. For example, the larger angle is divided into the required number of smaller ones, and if it is a division of a distance or substance that is required the position of a parallel is determined whose length across the angle is equal to the given distance, and the segments of this parallel made by the transversals forming the other angles are equal to the required parts. The lines or graduations which are employed to indicate the locations of the parallels may also be used to designate the location of prearranged pieces whose dimensions are made to correspond to the particular sizes of the segments of the parallels which they indicate, and the same graduations may designate figures or characters to represent them. On the other hand, if it is required to multiply the length of one of these parallels at any given distance from the apex, the requisite number of triangles are employed to represent the factor by which said dimension is to be multiplied and the total dimension, measured on the line on which the first one was taken, will be equal to the required dimension.

An instrument embodying the invention is illustrated in the drawings accompanying and forming a part of this specification, in which—

The main plate, to which all the parts are more or less connected, is designated by A. It is supported on the projections or legs B, which are provided with rubber tips c.

In this description the instrument is referred to as if it were held in a vertical plane, with the jaws of the gage downward, the position in which it is naturally held while the parts are being adjusted.

The main computing element is comprised in the swinging radial bar 111. The pivot 110 upon which it swings projects from behind the middle of the said bar and has its bearing in the plate A near its center and is held from the opposite side by the screw 113ª. The forward enlarged end of said pivot, which forms the support-plate 113, is laterally offset for clearance up to its center, which is in the plane of the straight left or computing edge of said bar. The groove 194 is cut into the lower forward side of the bar to receive the end of a clamping-screw belonging to one of the attachments of the instrument, described farther on. The bar has the graduated scale 157, which extends in both directions from the center of said pivot 110.

Figures 1, 8:
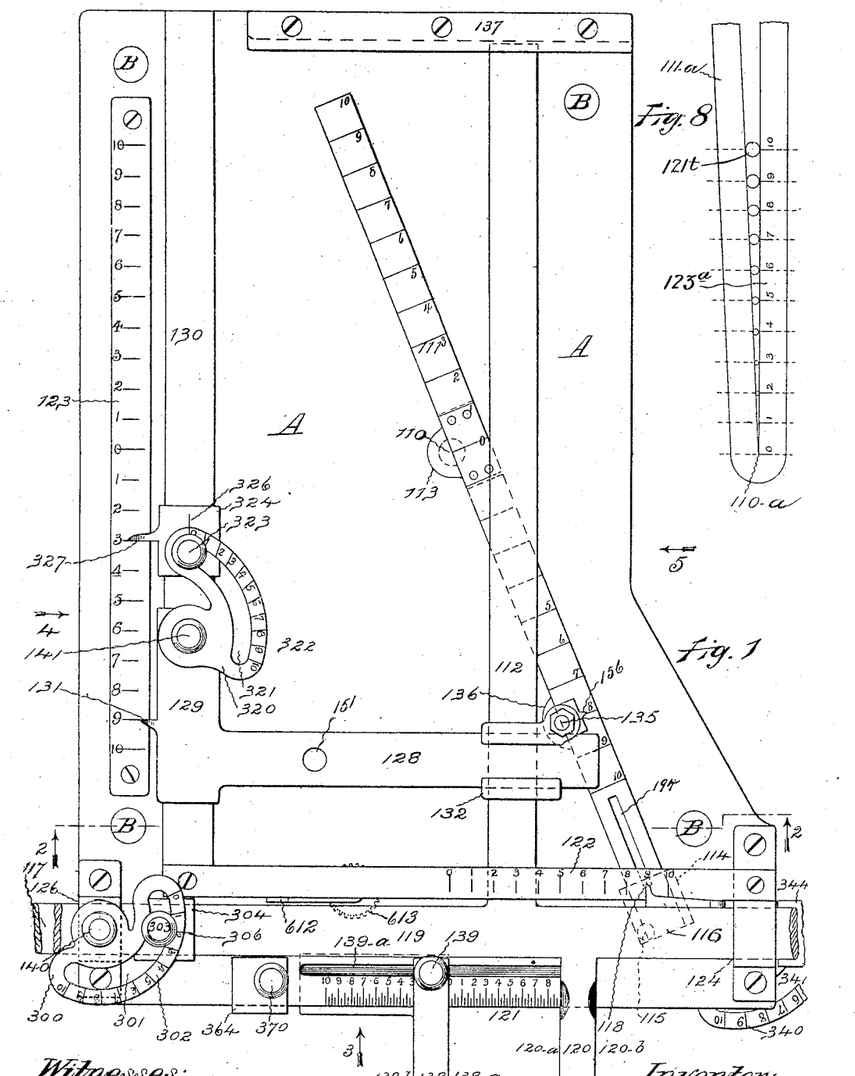
Figure 1 is a plan view.
Fig. 8 shows the tapered test-gage used when the increase of the dimensions of the substances to be measured is constant and includes dotted lines to show the relations of the equidistant parallels referred to above to the dimensions of the substances.
Figure 2:
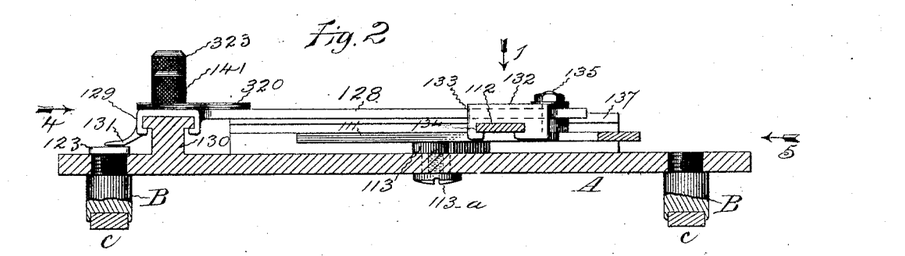
Fig. 2 is a section through the line 2 looking in the direction indicated by the arrow 2, Fig. 1.
Figure 5:
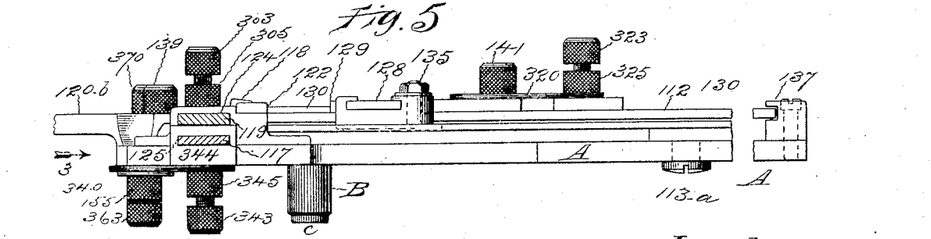
Fig. 5 is a right view, as indicated by the arrow 5, Fig. 1.
Figures 6, 9, 10:
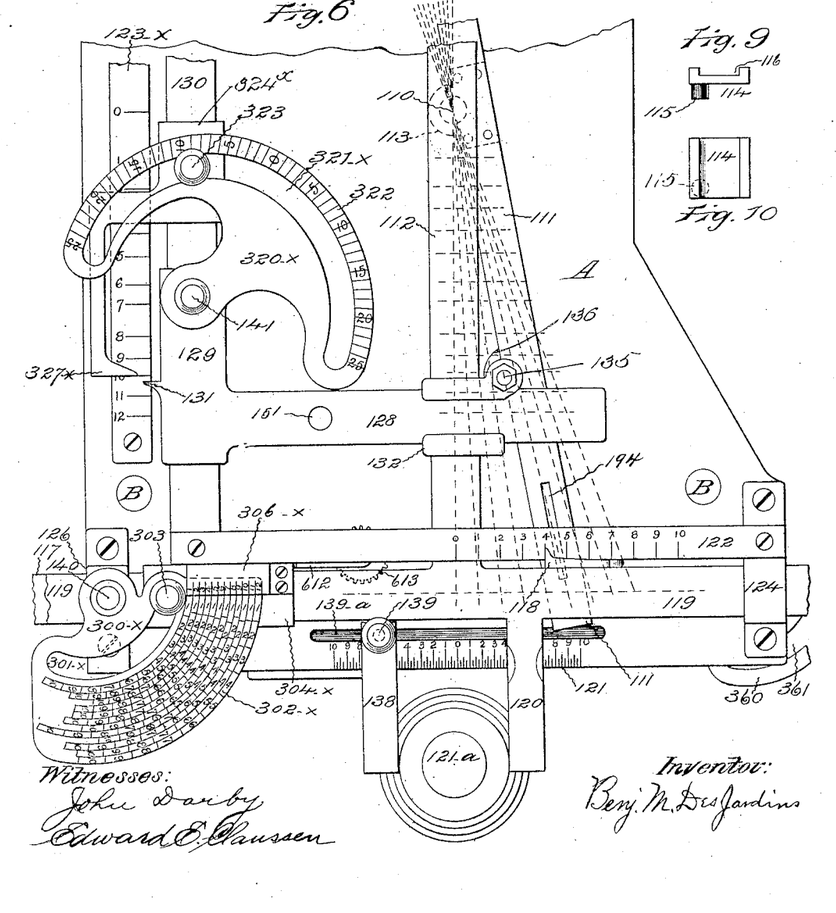
Fig. 6 is a view of a modified form, showing necessary changes of parts for calculating substances whose differences in sizes are not constant and also shows the necessary dotted lines illustrating the theorem referred to above.
Figs. 9, 10, 11 are details.

The longitudinally-movable slide-bar 117 is located directly behind the T-bar 119, Figs. 1, 3, 4, 5, and 13, and operates the guide-block 114, Figs. 1, 9, and 10, which has the rearwardly-projecting stud 115 entering into it and the guideway 116 to engage and swing the radial bar. The center of the stud 115 is in line with the left edge of the guide 116. The slide-bar 117 is a plain straight bar having a hole to receive the projection 115 and teeth cut into a part of its upper edge, Fig. 13. It is also provided with the pointer or index 118, Figs. 1 and 5, which is fastened to its upper side and projects forward, passing above the T-bar 119 and then toward the left in front of the guide-block 114 to line up with the center of the stud 115, then upward over the scale 122, on which it registers. The said bar 117 slides longitudinally in its boxes 125 near the right and 127 near the left edge of the plate A and when adjusted is clamped into place from behind the instrument by means of the knurled screw 142, Figs. 3 and 4, which is threaded through the plate A behind the said box 125. The scale 122 is a metal strip fastened at each end to the plate A, passing over the said bar 111 and its guide-block 114 and the T-blade 112. The graduations on the said scale 122 indicate the amount of deviation in the said bar 111, which is measured along the line of motion of the bar 117 and reckoned on a line which passes through the center of the stud 115, its path being indicated by a dotted line in Fig. 6.

The laterally-movable vertical T-blade 112 is carried by the T-bar 119, which slides longitudinally in the boxes 124 and 126, fastened to each side of the plate A, and is clamped into position by means of the knurled screw 140, which is threaded through the forward part of its left box. The upper end of the said blade 112 slides in the guide 137. The said T-bar 119 of said blade 112 is further provided with the gage-jaw projection 120, which has the two gaging-surfaces 120ª and 120ᵇ. The scale 121 on the shaft A is graduated from both sides of a vertical line through the center of the pivot 110, which may be termed the "fixed" pivotal point of the radial bar, to register the position of the blade 112 and said jaw 120. In this case it is graduated to eighths and thirty-seconds of an inch as a convenient standard to measure the dimensions of substances.

A head 129 slides on the fixed guide-rib bar 130, which projects from the plate A, and carries a horizontal T-blade 128, extending to the right beyond the farthest position of the blade 112, passing in front of it. Its pointer 131 registers its position on the vertical fixed scale 123, which is attached to the plate A and which is graduated in both directions from a horizontal line through the center of the pivot 110. The blade 128 has the hole 151 to fasten the attachment for extracting the square root described farther on.

The intersection-block 132 has the forward horizontal groove to receive the blade 128 and the rearward vertical groove to engage over the blade 112. It has also has a projection to receive the stud 135 of the inwardly-projecting pivoted contact-piece 136, Figs. 1, 11, 12, whose right engaging edge is in the plane of the center of the said stud 135 and matches the computing edge of the bar 111. The pointer 156, Fig. 12, projecting in front of said bar 111, is also a part of the said contact-piece and its stud, whose center is thereby registered on the scale 157. The blade 112 forms a guide for the intersection-block 132 and contact-piece 136, by which the latter is guided in straight lines intersecting the transversals formed by the computing edge of the bar in its different positions—that is, across which the bar swings. The blade 128 forms a guide for the intersection-block 132 and contact-piece 136, by which the contact-piece is guided at right angles to the guide 112.

The adjustable gage-jaw 138, which is provided with the inner and outer gaging-surfaces 138$^a$ and 138$^b$, is slotted in its upper enlarged end to straddle the plate A. That part which extends back of said plate is provided with an L projection to support it rigidly therewith. It is clamped into place by the knurled screw 139, whose point is rounded, and enters into the V-groove 139$^a$ in said plate A.

The anchor-block 304 is box-shaped and fits loosely around the guide-bar 119, to which it is clamped when required by means of the knurled screw 303, which is threaded through the front of said block and wedges against the said bar. The eccentric-plate 300 is pivoted to and swings on the body of the screw 140 of the left box 126, and its slot 301 surrounds and engages the body of said screw 303, thereby anchoring and adjusting the horizontal position of the contact-piece 136 and the gage 120. The eccentric-plate 300 has the graduated scale 302, whose position is registered at the index 306 on said block 304. The knurled nut 305 on said screw 303 when required clamps the said eccentric-plate 300 into position, Fig. 3. These parts constitute a micrometer adjustment for the T-blade 112.

The anchor-block 324 has a T-groove to fit over the guide-bar 130 and is clamped to the letter when required by means of the knurled screw 323. It has the projecting pointer 327 to register on the scale 123. The eccentric-plate 320 is pivoted on the body of the screw 141 and engages the screw 323, being clamped after adjustment by the nut 325, Fig. 4. It has the graduated scale 322, which registers at the index 326 to indicate the adjustment of the head 129 with reference to the block 324. These parts constitute a micrometer adjustment for the horizontal T-blade 128.

The anchor-block 344 engages in a similar way the slide-bar 117, being clamped thereto by the screw 343, Fig. 5. The eccentric-plate 340 is pivoted on the screw 142 and is held in place when required by the nut 345 on said screw 343. It is provided with a scale which is similar to the scale 302 on the eccentric-plate 300.

Figure 3:
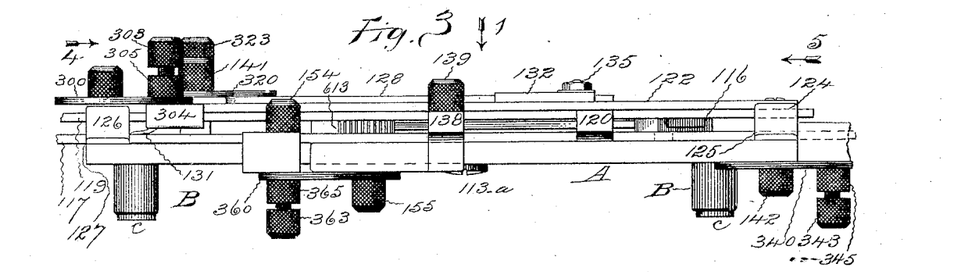
Fig. 3 is an end view looking in the direction indicated by the arrow 3, Fig. 1.
Figure 4:
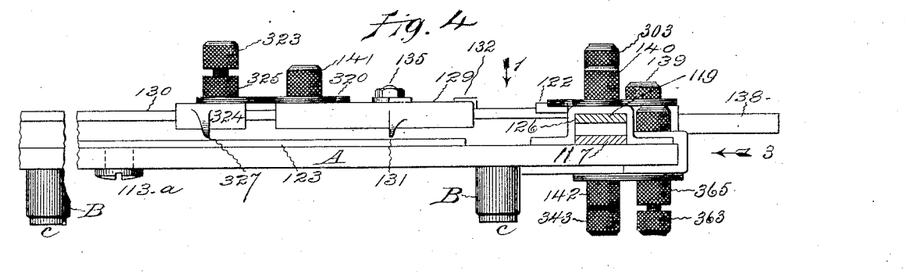
Fig. 4 is a left view, as indicated by the arrow 4, Fig. 1.

The anchor-block 364 is slotted to straddle the lower edge of the plate A and is clamped thereto by the knurled screw 370, Figs. 1 and 3. The knurled screw 363 is also threaded into the said block to clamp it to plate A from the rear of the instrument, if required. The eccentric-plate 360 is similar in all respects to the eccentric-plate 300 and is held to the L projection of the jaw 138 by the knurled screw 155, and when adjusted is clamped into position against the anchor-block by the knurled nut 365 on the said screw 363. The eccentric-plates 340 and 360 and their connections form micrometer adjustments for the slide-bar 117 and the gage-jaw 138, respectively.

Figures 11, 12, 13:
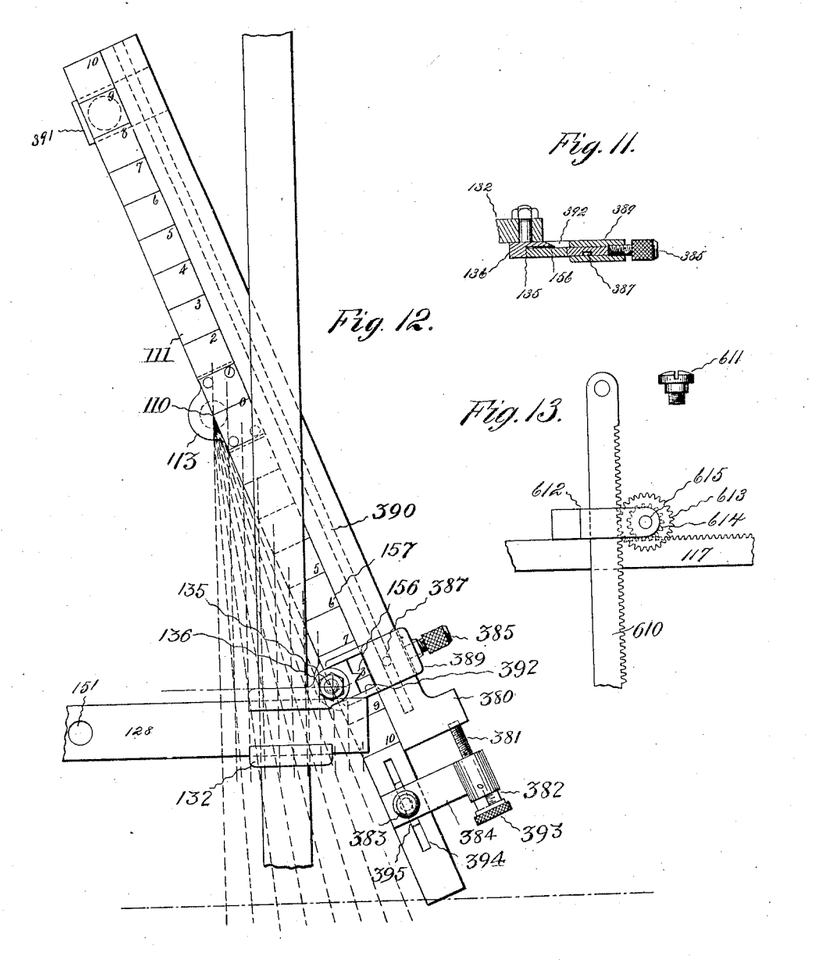
Fig. 12 shows an attachment for measuring from the graduations on the dividing-bar 111.
Fig. 13 shows the attachment which is used for extracting the square root.

The adjusting-bar 380 is of even thickness with the radial bar 111 and is guided against said bar at the upper end by means of the projecting guide 391, Fig. 12, whose left end is turned forward to form the guideway and whose round rearward projection is in contact with the plate A to hold said bar 380 in its place. It is held against the bar 111 at the lower end by the end of the micrometer-screw 381, which enters into it. The said micrometer-screw is threaded in the projection 384, and its general construction and its graduations at 382 are similar to those of the ordinary screw-micrometer and divide the graduations on the scale 157.

The bracket 384 has its end slotted and adapted to straddle the said bar 111 and is clamped to it by means of the knurled screw 383, whose end abuts against the key 395 in the groove 394 of the said bar. The adjustable connecting-block 389, Figs. 11 and 12, is similarly slotted to straddle the said guide-bar 380, and has the pin 387 within the said slot to enter and engage the groove 390. The block connects the guide-bar 380 to the pointer 156 by means of the projections 392, which extend in front of said bar 111 and on each side of the said pointer, said connecting-block being adapted to follow the vertical travel of the contact-piece 136. It is clamped into position by means of the knurled screw 385, which is threaded in the said block to clamp the said bar between its end and the said pin 387.

Figure 7:
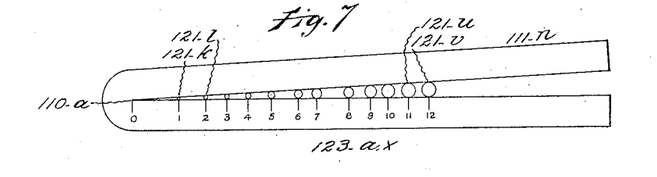
Fig. 7 shows the tapered test-gage graduated to correspond with the modification shown in Fig. 6.

The test-gages 111$^m$, Fig. 8, and 111$^n$, Fig. 7, have their angle-openings to correspond with the angle which the computing edge of the radial bar 111 makes with the T-blade 112 when the pointer 118 is on the first graduation of the scale 122, the right edge of blade 112 being considered as passing through the center of the stud 135. The graduations on the scale 123$^a$ of gage 111$^m$ and the scale 123$^{a\times}$ of gage 111$^n$ respectively correspond to those on the scales 123 in Fig. 1 and 123$^\times$ in Fig. 6.

The special eccentric-plate 320$^\times$, Fig. 6, is a modified construction of the eccentric-plate 320 shown in Fig. 1 and is used in place of the latter for specific operations. Its scale 322$^\times$ is graduated to hundredths of an inch to register the adjustment of the slide 129 accordingly. The anchor-block 324$^\times$ is provided with the pointer 327$^\times$, which is offset to project downward and is adapted to register in conjunction with the pointer 131 on the scale 123$^\times$.

The special eccentric-plate 300$^\times$ is a modified form of eccentric 300 and has in this construction twelve graduated scales 302$^\times$, all of them having specific measuring values to correspond with the graduations on said scale 123$^\times$. The indicator-block 306$^\times$ is fastened to the anchor-block 304$^\times$ and is offset to project above the said special eccentric-plate and is provided with a suitable numbered index to conveniently indicate which one of the said scales 302$^\times$ is required.

The gears 613 and 614, Figs. 6 and 13, are mounted on the pivot 615, whose bearings are in the plate A and the bracket 612. The larger gear 613 meshes into the removable bar 610, and the smaller gear 614 meshes into the said bar 117. The said bar 610, which is not shown connected to the instrument in Fig. 6 but attachable thereto, is fastened to the T-blade 128 through the hole 151 by means of the screw 611, and in the adjustment of the computing edge of bar 111 against the contact-piece 136 it is adapted to operate the bar 117 in conjunction with the slide 129, causing them to move simultaneously and at the speed required for extracting the square root of the dimensions of a substance between the gage-jaws 120 and 138 or any number indicated by the fixed horizontal position of the said contact-piece 136.

The underlying methods and functions of my invention will now be explained. Geometrically speaking, the longitudinal motion of the slide-bar 117 is proportional to the tangents of the angles described by the left straight edge of the radial bar 111 and a line passing through the center of pivot 110 and parallel with the blade 112—that is, considering the value of the angle in this construction to be designated by that which the computing edge of the bar 111 forms with its normal position, in which it is perpendicular to the direction of motion of the bar 117, the measure of the tangents being on lines parallel with the motion of bar 117 and passing through the graduations of the scale 123. The radial position of bar 111 is registered, as already described, by the pointer 118 on the scale 122, which is graduated at equal distances apart to represent equal differences between a series of consecutive triangles which have their apices on a common point and their bases upon the same straight line. These graduations are employed to locate a known proportional difference between a known and an unknown quantity, and they may also designate the number of parts which are counted or necessary in connection with it. One of these tangents referred to—that is, the one whose measure corresponds to the known quantity—is selected and employed to measure the unknown one when its angle has been increased or decreased by the said longitudinal motion of said bar 117, according to the said known proportional difference, or the said tangent by its fixed location on a line passing through one of the graduations on said scale 123 may represent the said unknown quantity. These differences may also be regarded as individual elements representing the bases of a series of triangles whose areas are proportional to their bases, and the graduations on said scale 122 may be any distance apart to proportionally represent the parts into which the dimensions or numbers are divided, the parts added or substracted, &c., whether they are equal or unequal.

The center of the stud 135 represents the contact-point of the intersection of the blade 112 and the blade 128 against the said computing edge of the bar 111. The said contact-piece 136 is the mechanical embodiment of the said contact-point and is adapted to bring it into contact against the said computing edge without needless wear to the instrument. The vertical position of the said contact-point is registered by the pointer 131 on the scale 123, and its horizontal position is represented by the gage-jaw 120, whether it is opened to receive a substance or whether it is indicated by the graduations on the scale 121. The said contact-point has its horizontal paths on the said tangents referred to above, which are registered or located on the said scale 123—that is, the said paths are always on a straight line which passes through the said pointer 131 and parallel with the said horizontal motion of said bar 117 at whatever position the said slide 129 may be, and the positions of its vertical paths, which are registered on the said scale 121, are on a line with the gaging-surface 120$^a$ of the gage-jaw 120, said gaging-surface being parallel with the bar 112. When the said contact-point is against the said computing edge of said bar 111, it is also on a straight line between the centers of the said pivot 110 and the stud 115. The travel of the center of the said stud 115, which is shown by a straight dotted line in Fig. 6, represents the straight line which is intersected by the transversals which pass through a common point mentioned in the geometrical theorem referred to, and the horizontal paths of the center of stud 135 when at its various positions as registered on the scale 123 represent the other lines which are parallel to it, while the transversals themselves are reproduced by the said computing edge of said bar 111. The amount of travel of the studs 115 and 135 are proportional to their distance from the center of pivot 110, both being limited between the said computing edge of bar 111 and a line parallel to blade 112 and passing through the said center of pivot 110.

The computing edge of the bar 111 for accuracy is preferably in line with the center of its pivot; but the body of the bar may be on either side—that is, the contact-piece 136 can be made to wedge against the opposite side of said bar from that on which it is shown as located without changing the result. In the present construction the measurement is practically taken within the angle made by two diverging bars, while in the change suggested it would be taken outside of a tapered body. Mechanically speaking, the said computing edge is the configuration of a member which the said bar 111 is adjusted to represent, and its incline operates the contact-piece 136, causing it to travel horizontally until it is intercepted by the presence of the substance against the jaw 138 and in the path of the jaw 120, the time of its travel being determined along the said scale 123. The position of the said computing edge of said bar 111, which determines the amount of incline in the configuration or cam-surface thereof, as already stated, is a known quantity fixed by the position of bar 117 and determining the speed of said contact-piece 136. This peculiar configuration referred to above, which is the leading feature of my improvement, is so disposed that when it is adjusted or changed at one point all the other points are adjusted or changed proportionally to their distance from an initial point, which in this case is the center of said pivot 110, and this adjustment or change may be in the form of a division of the original size or that of multiplication, addition, or subtraction. The constantly-increasing distances across the said angle, whose functions in the machine is that of a substituted member, whose configuration is described by the said computing edge and its base which are reckoned on a vertical line through the center of said pivot 110, is referred to in this description as the "fixed" dimensions of said member, and the distance along the scale 123 as the "time" of the travel of the contact-piece 136. The travel from the said base to the said computing edge along a line parallel with said bar 117 is referred to as the "speed," being the terms used with reference to the motions produced by ordinary cams in machinery. I refer to "dimensions" and "numbers;" but the two may be included in the former, which is readily substituted for the latter when represented by a scale, &c.

The change of configuration or inclination in the cam referred to is for the purpose of changing the number of parts which are being considered and is designed to do away with the necessity of using a different member for every different number or part required or as many members used collectively as there are different numbers or parts required. The underlying method of my improvement is preferably reduced to practice by dealing with dimensions or numbers in their normal order—that is, in the order in which they increase or decrease—and in this construction I prefer to deal with dimensions or numbers in which the increase or decrease is constant, and if there is any variation between successive sizes of dimensions or numbers I prefer to indicate the said variable differences by placing the indicating graduations, &c., (scale 123,) at corresponding distances apart and avoid a curve in the said computing edge. The same method, however, might be carried out by constructing the said computing edge suitably formed to meet any required variable dimensions or segments at whatever point they might reach. The said computing edge, representing one side of a triangle in geometry and an incline or cam in mechanics, is adjusted to represent as many fixed dimensions as there are different sizes of substances which are intended to be computed by the instrument. Each one of these fixed dimensions is disposed to be identified by a corresponding dimension of some substance to be computed, and the required fixed but unknown dimension to be sought by the said computation is indicated by the location of the said fixed dimension of said incline or cam on the said scale 123. In other words, the graduations on the said scale 123 locate the terms of an arithmetical progression and may be so considered when used to compute or calculate numbers, &c. The first term, as therein shown, is equal to the common difference. The peculiarity of the improvement consists in the operation of bar 111, which is capable of increasing the said common difference by multiplication, addition, subtraction, or division, and in the present construction of my instrument this change, which is registered by the pointer 118 on scale 122, is equal to or a multiple of the said common difference registered on the said scale 123, the said scale having been constructed for the purpose of multiplication and division, and in cases where the instrument is used to determine upon or locate a required size of substances the said substances are each made up or composed of as many of said differences as are contained in the term or expressed by the graduation adjoining which it is located for identification.

The bars 117 and 610 are so geared that no matter which one is moved, their respective indicating-pointers 131 pointing out the quotient and 118 indicating the divider, always register on the same graduations of their respective scales 123 and 122 for the purpose of extracting the square root of the dimension of a substance between the jaws 120 and 138 or of a number indicated by the scale 121, the process of extracting the square root being a division in which the quotient is always the same amount as the divider.

The graduations of the scale 123$^a$ of the test-gage 111$^m$ register the common difference between distances across the said gage, the said difference being the same as that registered on the said scale 123. The graduations on the scale 302 of the eccentric 300 also register the same difference. The said eccentric 300 is employed in connection with the blade 112 and is supplemental to the said bar 111 and is also adapted to determine the number of said differences which are necessary to be added to a given number of dimensions or substances in order to increase their combined dimension up to a required one, thereby determining how many of the succeeding larger size are required. In other words, if a given space is required to be filled by a given number of pieces and the requisite number of the largest size which can enter therein are first selected and they do not fill it, the eccentric 300 may then be employed to determine how many of the next succeeding larger size are required in place of an equal number of the first ones selected to produce the dimension sought for. The eccentric 360 also adjusts the distance between the jaws 120 and 138, thereby performing practically the same function as the said eccentric 300; but it has a peculiar advantage over the latter for measurements of the same kind or class, because the jaw 138 instead of jaw 120 is adjusted thereby and in this particular case is disturbed only for the purpose of determining the said number of differences referred to. This arrangement of parts makes it possible to permanently secure the block 364 to the plate A when the instrument is employed for a specific purpose in connection with the same kind of measurements. The more general adjustment of the jaw 120 in connection with the blade 112 being wholly independent of said eccentric 360, the latter is no way effected thereby. In other words, if a given space is required to be filled by a given number of pieces and the requisite number of the largest size which can enter therein does not quite fill it the eccentric 360 may then be employed to determine how many of the next succeeding larger size are required in place of the first ones selected to produce the dimension sought for.

The operation of the instrument as illustrated by its application to special cases of calculation is as follows:

1. The example shown at 121$^a$, Fig. 6, illustrates a rod which is to be turned down at one end until it is five-eighths of an inch in diameter. The difference between the two sizes is required to be divided into seven equal shoulders and the instrument is to be so adjusted that it can be used as a caliper to gage the various shoulders as they are successively turned down. The rod 121$^a$ is shown as having three of its shoulders already turned to the required size. The L-jaw 138 is first moved five-eighths of an inch to the left of the 0 graduation of scale 121 to indicate the smaller part of the rod, in regard to which no calculation or division is to be made. The rod is then inserted between the jaws 120 and 138 to fix the first position of the blade 112 and the position of the jaw 120 to gage the outside diameter. The rightward graduation of the scale 121, which registers its position, indicates the amount of metal to be removed.

(a) The bar 117 is moved until its pointer 118 registers on the seventh graduation of the scale 122 to denote the number of parts into which the difference is to be divided. The slide 129 is moved upward until the contact-piece 136 is intercepted by the bar 111, at which point it is secured by the knurled screw 141. The position of the pointer 131 on the scale 123 now indicates at what point on the corresponding scale 123$^a$ the test-gage 111$^m$ will give the full size of the shoulder taken on both sides of the rod or twice the depth of the single shoulder measured on one side thereof. The pointer 118 can now be shifted along the scale 121, and its successive graduations will give the successive positions of the caliper-jaws required to gage the various shoulders as they are turned down—that is, the pointer 118 on the sixth graduation locates the caliper-jaws to gage the sixth shoulder on the fifth graduation, the fifth shoulder, &c. If it is required to set the caliper-jaws to gage a fraction of one of said shoulders, the eccentric 320 is adjusted to indicate the amount of said fraction.

(b) The slide 129 is adjusted with the bar 111 against the contact-piece 136 until the pointer 156 is located on the scale 157 at the graduation which indicates the number of shoulders required. This adjustment fixes the angle of the said bar 111. The said slide 129 can then be pushed upward for each adjustment of the said jaws, successively fastening it as the said pointer registers on each of the said graduations 157 for setting the caliper to gage each successive shoulder. If it is required to set the caliper-jaws to gage a fraction of one of said shoulders the micrometer 382 is adjusted to indicate the amount of said fraction. The size of the shoulders in this case might be indicated by lines parallel to blade 112 and passing through the said graduations 157 at the point where they meet the said computing edge of said bar 111.

The jaw 120 is brought toward the jaw 138 by the incline of the said bar 111 as the said slide 129 is pushed upward. The amount of motion in said jaw is governed by the angle of said bar, the said angle being fixed, as stated, by the combined locations of jaw 120 on the rod and the pointer 156 on the scale 157.

2. In the case where a certain space or distance is to be filled by a given number of pieces whose dimensions register on the graduations of the scale $123^a$, the jaw 138 being secured at 0 on the scale 121, the jaw 120 is located to denote the space required to be filled, and the pointer 118 is located on the scale 122 to indicate the number of pieces required. The slide 129 is moved with the contact-piece 136 against the bar 111, at which position the pointer 131 indicates the size required on the scale 123.

If the said pointer happens to fall between two graduations of said scale, the proportional number of the two sizes which said graduations represent may be ascertained as follows:

(a) The anchor-block 304 is clamped to the bar 119, the latter being released from its screw 140, and the operator with his right hand turns the eccentric 300, while with the left he presses the slide 129 upward, following the said eccentric until the said pointer 131 is opposite the next lower graduation of said scale 123, and the position at which the scale 302 registers on the indicator 306 will give the number of the larger pieces required, the balance of the space to be filled by the smaller ones.

(b) Having determined upon the largest size of a given number of available pieces which will enter into a given space, if the said pieces are inserted between the caliper-jaws and, the anchor-block 364 being clamped to the plate A and the jaw 138 being loosened therefrom, if the eccentric 360 is turned until the said pieces are tightly clamped, the index on the said eccentric will register the number of the said pieces which must be changed for a similar number of the next succeeding larger size in order to make up the required dimension.

(c) If the available pieces register on the scale $123^{a\times}$, the same operation explained in a is carried out by selecting the particular graduated scale $302^\times$ which registers on the index $306^\times$ corresponding to the graduation on scale $123^\times$, which is below the pointer 131, as illustrated in Fig. 6.

3. The instrument can be used to divide a space or distance to determine one of a given number of equal parts by setting the caliper-jaws 138 on the 0 graduation of scale 121 and 120 rightward to indicate the amount to be divided.

(a) The pointer 118 is placed on the graduation of scale 122, which indicates the divider, and the slide 129 is then moved until the contact-piece 136 is against the bar 111. The pointer 131 if taken on the corresponding scale $123^a$ of the test-gage $111^m$ will give the accurate size required, and if the said slide is fastened by its screw 141 and the pointer 118 then made to register on the first graduation of the scale 122 and the bar 119 adjusted accordingly the opening between the caliper-jaws will also indicate the accurate size required.

(b) The pointer 156 is placed on the graduation of the scale 157, which indicates the divider, and the bar 117 clamped into place. The said pointer is then removed to the first graduation on said scale, and when the parts are into position the opening between the jaws will be the size required.

The dimensions ascertained by means of the operation described above can be redivided (a) by means of the eccentric 360 and (b) by means of the micrometer-scale 382.

4. To perform examples in division, the dividend is represented on the scale 121. As already stated, the said scale in this construction is graduated to measure the dimensions of substances in eighths and thirty-seconds of an inch, and when employed for the purpose of recording the dividend of a number the said graduations can be made to correspond with those on the scale 302 or the scale 360, corresponding in units of value to the difference registered by the scale $123^a$.

(a) The pointer 118 is located on the scale 122 for the divider, and if the graduations thereon are not sufficient to express it the eccentric 340 is used supplemental thereto. In this manner the angle of the dividing-bar 111 fixes the position of the contact-piece 136, whose attendant pointer 131 locates the quotient on the scale 123. In case the quotient is not a whole number the eccentric 320 upon the adjustment of pointer 327 on the nearest graduation of said scale 123 will register the amount of the remainder.

(b) The pointer 156 is located on the scale 157 to give the divider. This latter adjustment fixes the position of the bar 111, at which point it is secured. The blade 112, which at its rightward position represented the whole number, is unclamped, and the pointer 156 is moved along the scale 157 to the graduation which represents the part of the said dividend required, and the contact-piece 136 being kept tight against the computing edge of said bar 111 will locate the blade 112 and the jaw 120 and give the answer required between the caliper-jaws and on the said scale 121.

5. In performing examples in multiplication the multiplicand is preferably expressed by the position of the pointer 131 on the scale 123 and the eccentric 322 to represent a fraction. The multiplier is similarly expressed by the position of the pointer 118 on the scale 122, and the eccentric 340 is employed in case of a fraction. Upon the adjustment of the contact-plate against the bar 111 the position of the blade 112 as registered by the scale 121 or its supplemental eccentrics 300 or 360 will give the required product. This operation is the reverse of division already described above. A corresponding result can be secured by the adjustment of the pointer 156 on the scale 157 for the multiplier.

6. To perform examples in such specific cases of addition, for which this instrument is applicable, in a limited way and particularly for ascertaining the sums of various proportional numbers, the operation is preferably as follows: Supposing I have the amounts 2 3/10, 1 7/10, 4 6/10, and 1 1/10 to be added and then redivided to A 3 4/10, to B 2 6/10, to C 2 9/10, and the balance to D, the pointer 118 is adjusted on successive graduations of the scale 122 to indicate the various amounts which are to be added together. This may be facilitated by using the eccentric 340. The pointer 131 is then placed on the successive graduations of the scale 123 to express the various proportions which are to go to A B C, &c., and the result is given on the scale 121 and its corresponding eccentric 300, &c. Similar operations will perform similar examples in which subtraction is used, &c.

7. To extract the square root, the bar 610, Fig. 13, is attached to the instrument by passing it between the gear 613 and the bracket 612, between the bars 117 and 119, and under the blade 128, to which it is fastened by means of the screw 611 through the hole 151.

(a) The substance is inserted between the caliper-jaws and the slide 129 is pushed upward, and its motion, by means of the rack 610, rotates the gear 613, whose shaft 615 in turn rotates the gear 614, which meshes into the bar 117, sliding it longitudinally at such a speed that when the pointer 131 reaches any graduation on the scale 123 the pointer 118 of the bar 117 will reach the corresponding one on the scale 122, keeping the divider and the quotient always the same amount. The slide 129 is moved upward to meet through the contact-plate 136 the correspondingly-adjusted bar 111, locating the said pointers 131 and 118 on their respective scales.

(b) If it is required to extract the square root of a number—say 5 7/10—the jaw 120 is accurately located 5 7/10 rightward on the scale 121 (the graduations used being those which correspond to those on the scale 302) and the blade 112 is clamped at that position. The operation is then the same as that described in (a), the said pointers 131 and 118 giving the square root on their respective scales 123 and 122.

The few of the multitudinous applications and operations of the instrument which is the embodiment of my invention described above are sufficient to illustrate its use.

In the following claims I shall refer to the various scales and moving parts as being vertically and horizontally arranged for the sake of convenience, the parts being assumed for this purpose to be located as shown in Figs. 1 and 6 when the drawings are in a vertical position—that is, when the base-plate A is in a vertical plane. It is to be understood, however, that the directions mentioned are merely relative and not intended to limit the location of the several parts to any particular plane or position.

With this understanding, what I claim, and desire to secure by Letters Patent, is—

1. In a calculating mechanism, the combination of a radial bar arranged to swing about a fixed pivotal point and having a computing edge, a guide movable transversely to the bar, and a contact-piece movable on said guide in parallel planes intersecting the transversals formed by the computing edge of the bar and limited in its movement by said computing edge.

2. In a calculating mechanism, the combination of a radial bar arranged to swing about a fixed pivotal point and having a computing edge, a vertical laterally-movable guide, a horizontal laterally-movable guide, and a contact-piece movable on said guides and limited in its movement by the computing edge of the bar.

3. In a calculating mechanism, the combination of a radial bar arranged to swing about a fixed pivotal point and having a computing edge, a vertical laterally-movable guide, a horizontal laterally-movable guide, an intersection-block movable with both of said guides and free to be moved on each guide by the other guide, and a contact-piece carried by said block and engaging the computing edge of the bar.

4. In a calculating mechanism, the combination of a radial bar arranged to swing about a fixed pivotal point and having a computing edge, a slide for positioning the radial bar, a laterally-movable guide, means for indicating the position of the bar and guide, and a contact-piece guided by said guide to move in parallel planes intersecting the transversals formed by the computing edge of the bar and limited in its movement by said computing edge.

5. In a calculating mechanism, the combination of a radial bar arranged to swing about a fixed pivotal point and having a computing edge, a guide movable transversely to the bar, a micrometer device for adjusting the bar, and a contact-piece guided by said guide to move in parallel planes intersecting the transversals formed by the computing edge of the bar and limited in its movement by said computing edge.

6. In a calculating mechanism, the combination of a radial bar arranged to swing about a fixed pivotal point and having a computing edge, a guide movable transversely to the bar, a micrometer device for adjusting said guide, and a contact-piece guided by said guide to move in parallel planes intersecting the transversals formed by the computing edge of the bar and limited in its movement by said computing edge.

7. In a calculating mechanism, the combination of a radial bar arranged to swing about a fixed pivotal point and having a computing edge, a guide movable transversely to the bar, a slide carrying said guide, a gage-jaw carried by said slide, a second gage-jaw, and a contact-piece guided by said guide to move in parallel planes intersecting the transversals formed by the computing edge of the bar and limited in its movement by said computing edge.

8. In a calculating mechanism, the combination of a radial bar arranged to swing about a fixed pivotal point and having a computing edge, a movable contact-piece the movement of which is limited by the computing edge of said bar, and means for indicating the position of said contact-piece with relation to two straight lines lying parallel with the plane in which said bar swings and extending at right angles to each other.

9. In a calculating mechanism, the combination of a radial bar arranged to swing about a fixed pivotal point and having a computing edge, a contact-piece movable in parallel planes across which said bar swings, the movement of which contact-piece is limited by the computing edge of said bar, an indicator moving with said contact-piece, and a scale over which said indicator moves.

10. In a calculating mechanism, the combination of a radial bar arranged to swing about a fixed pivotal point and having a computing edge, a movable contact-piece the movement of which is limited by the computing edge of said bar, a laterally-movable guide for guiding the movement of said contact-piece in straight lines across which the bar swings, a second laterally-movable guide for guiding the movement of the contact-piece in a straight line at right angles to the first-mentioned guide, and indicators and scales for indicating the position of said bar and guides.

11. In a calculating mechanism, in combination, a radial bar arranged to swing about a fixed pivotal point, a laterally-movable T-blade, a slide carrying said blade, a gage-jaw carried by said slide, a second gage-jaw independently adjustable, and a contact-piece cooperating with said T-blade and radial bar, for the purpose set forth.

12. In a calculating mechanism, in combination, a radial bar arranged to swing about a fixed pivotal point, a T-blade laterally movable, a contact-piece coöperating with said T-blade and radial bar, a gage-jaw movable laterally with the T-blade, a second gage-jaw adjustably connected to a fixed portion of the mechanism, and a fixed scale arranged to indicate the positions of said jaws, for the purpose set forth.

13. In a calculating mechanism, in combination, a radial bar arranged to swing about a fixed pivotal point, a laterally-movable T-blade, a contact-piece coöperating with said T-blade and radial bar, a gage-jaw laterally adjustable with the T-blade, a second gage-jaw laterally adjustable upon a fixed portion of the mechanism, a micrometer device for adjusting said latter gage-jaw, and a scale for indicating the positions of said jaws, for the purpose set forth.

14. In a calculating mechanism, in combination, a radial bar arranged to swing about a fixed pivotal point, a vertically-arranged blade laterally movable, a horizontally-arranged blade laterally movable, a contact-piece coöperating with said blades and said radial bar, and micrometer adjusting devices for said blades, for the purpose set forth.

15. In a calculating mechanism, in combination, a radial bar arranged to swing about a fixed pivotal point, a vertically-arranged blade laterally movable, a horizontally-arranged blade laterally movable, fixed scales for indicating the positions of said blade and bar, and separate micrometer adjusting devices for said bar and each of said blades, for the purpose set forth.

16. In a calculating mechanism, in combination, a radial bar arranged to swing about a fixed pivotal point, a T-blade, a contact-piece coöperating with said T-blade and bar, a slide carrying the T-blade, a gage-jaw carried by the slide, a second gage-jaw adjustable upon a fixed base or support, and a micrometer device for adjusting said slide, said micrometer device comprising an eccentrically-slotted pivoted plate provided with a series of scales, for the purpose set forth.

17. In a calculating mechanism, in combination, a radial bar arranged to swing about a fixed pivotal point, a vertically-arranged T-blade laterally movable, a horizontally-arranged T-blade laterally movable, an intersection-block in which both of said blades slide, and a contact-piece pivotally mounted in said block, and adapted to coöperate with the radial bar, for the purpose set forth.

18. In a calculating mechanism, in combination, a radial bar arranged to swing about a fixed pivotal point and having an operative edge which is radial to said point, horizontal and vertical laterally-movable T-blades, an intersection-block carried by said blades, and a contact-piece pivotally mounted in said block and having a straight edge passing through its pivotal center, said straight edge being adapted to coöperate with the operative edge of the radial bar, for the purpose set forth.

19. In a calculating mechanism, the combination of a radial bar arranged to swing about a fixed pivotal point, horizontal and vertical laterally-movable T-blades, a horizontal slide connected with the free end of said radial bar, and gearing connecting the horizontal T-blade and said horizontal slide, for the purpose set forth.

20. In a calculating mechanism, the combination of a radial bar arranged to swing about a fixed pivotal point, vertical and horizontal laterally-movable blades, a contact-piece coöperating with said bar and blades, an adjusting-bar mounted on the radial bar and adapted to engage said contact-piece, and a micrometer device for said adjusting-bar, for the purpose set forth.

21. In a calculating mechanism, the combination of a radial bar arranged to swing about a fixed pivotal point, the adjusting-bar mounted to slide thereon, the scale on said radial bar, the vertical and horizontal T-blades, the contact-piece carried by said blades, the index on said contact-piece, and the connecting-block whereby the adjusting-bar engages and moves said contact-piece, for the purpose set forth.

22. In a calculating mechanism, in combination, a radial bar arranged to swing about a fixed pivotal point, a vertical guide, a head sliding on said guide, a T-blade carried by said head and arranged to intersect the radial bar, an anchor-block carried by the guide, and an eccentrically-slotted plate connecting said head and anchor-block to provide a micrometer adjustment for the T-blade, for the purpose set forth.

23. In a calculating mechanism, in combination, a radial bar arranged to swing about a fixed pivotal point, a guide parallel to the normal position of said bar, a head sliding on said guide, a T-blade carried by the head and arranged to intersect the radial bar, a scale and index to indicate the position of said head and T-blade, an anchor-block, means for holding the same in any desired adjustment on said guide, an index for indicating on said scale the position of the anchor-block, and a micrometer adjustment between said anchor-block and T-blade.

24. In a calculating mechanism, the combination of a radial bar arranged to swing about a fixed pivotal point and having a computing edge, means for indicating the position of the radial bar along a fixed straight line, and a contact-piece engaging the computing edge of the bar and movable in parallel planes at right angles to said fixed line.

25. In a calculating mechanism, the combination of a radial bar arranged to swing about a fixed pivotal point and having a computing edge, means for indicating the position of the radial bar along a fixed straight line, and a contact-piece engaging the computing edge of the bar and movable in parallel planes at right angles to said fixed line, and in planes at right angles to said parallel planes.

26. In a calculating mechanism, the combination of a radial bar arranged to swing about a fixed pivotal point and having a computing edge, means for indicating the position of the bar along a fixed straight line, a movable contact-piece the movement of which is limited by engagement with the computing edge of said bar, and means for indicating the position of said contact-piece along a straight line extending at right angles to the first-mentioned straight line.

27. In a calculating mechanism, the combination of a radial bar arranged to swing about a fixed pivotal point and having a computing edge, means for indicating the position of the bar along a fixed straight line, a movable contact-piece the movement of which is limited by engagement with the computing edge of said bar, and means for indicating the position of said contact-piece along straight lines extending at right angles to and parallel with the first-mentioned straight line.

28. In a calculating mechanism, the combination of a radial bar arranged to swing about a fixed pivotal point and having a computing edge, means for indicating the position of the bar along a fixed straight line, a movable contact-piece the movement of which is limited by engagement with the computing edge of said bar, and means for indicating the position of said contact-piece along a straight line extending parallel with the first-mentioned straight line.

29. The combination with the radial bar 111 having a computing edge, of the guide 112 movable transversely to the bar to establish parallels cut by the transversals formed by the computing edge of the bar, and contact-piece 136 movable on said parallels and limited in its movement by said computing edge, substantially as described.

30. The combination with the radial bar 111 having a computing edge, of the guide 112 movable transversely to the bar to establish parallels cut by the transversals formed by the computing edge of the bar, and contact-piece 136 movable on said parallels and limited in its movement by said computing edge, and guide 128 movable at right angles to guide 112 and on which said contact-piece 136 moves at right angles to said parallels, substantially as described.

31. The combination with the radial bar 111 having a computing edge, of the guide 128 movable along said bar in a straight line, and contact-piece 136 engaging the computing edge of the bar and movable on said guide transversely to said computing edge and with said guide along said edge, substantially as described.

BENJ. M. DES JARDINS.

Witnesses:
ISAAC A. ALLEN, Jr.,
EDWARD E. CLAUSSEN.